United States Patent [19]

Elvin et al.

[11] Patent Number: 4,824,814
[45] Date of Patent: Apr. 25, 1989

[54] CATALYST TREATMENT AND PROCESS FOR USING TREATED CATALYST

[75] Inventors: Frank J. Elvin, Kenner, La.; Jin S. Yoo, Flossmoor, Ill.

[73] Assignee: Chemcat Corporation, Kenner, La.

[21] Appl. No.: 98,911

[22] Filed: Sep. 21, 1987

[51] Int. Cl.$^4$ .................. B01J 29/38; B01J 38/64; B01J 38/60; C10G 11/05

[52] U.S. Cl. .................. 502/22; 208/52 CT; 208/113; 208/120; 502/25; 502/26; 502/31; 502/516; 502/521

[58] Field of Search .................. 502/25, 26, 27, 31, 502/35, 38, 516, 521, 22; 208/52 CT

[56] References Cited

U.S. PATENT DOCUMENTS 4,264,433 4/1981 McKay .................. 502/516
4,686,197 8/1987 Elvin .................. 502/521

Primary Examiner—Paul E. Konopka
Attorney, Agent, or Firm—Frank J. Uxa, Jr.

[57] ABSTRACT

A process for treating a catalyst useful to promote the conversion of a substantially hydrocarbon feedstock containing at least one first metal at least a portion of which is deposited on the catalyst forming a first metal-containing catalyst, which process comprises:

contacting the catalyst with at least one component of at least one second metal selected from the group consisting of antimony, tin, gallium, indium, zinc, tellurium and mixtures thereof to increase the second metal content of the catalyst, and demetallizing the first metal-containing catalyst to provide a demetallized catalyst having a reduced first metal content.

9 Claims, No Drawings

CATALYST TREATMENT AND PROCESS FOR USING TREATED CATALYST

The present invention relates to improved treatment of catalyst which is contaminated by one or more first metals in hydrocarbon conversion service. More particularly, the invention relates to such an improved catalyst treating process which involves contacting the catalyst with at least one of certain second metal components, demetallizing the catalyst to reduce the first metal content of the catalyst, and to an improved hydrocarbon conversion process utilizing such treated catalyst.

Catalytically promoted processes for the chemical conversion of hydrocarbons include cracking, hydrocracking, reforming, hydrodenitrogenation, hydrodesulfurization, etc. Such reactions generally are performed at elevated temperatures, for example, about 300° F. to about 1200°F., more often about 600° F. to about 1000° F. Feedstocks to these processes comprise normally liquid and solid hydrocarbons which, at the temperature of the conversion reaction, are generally in the fluid, i.e., liquid or vapor, state and the products of the conversion usually are more valuable, e.g., lower boiling, materials.

In particular, cracking of hydrocarbon feedstocks to produce hydrocarbons of preferred octane rating boiling in the gasoline range is widely practiced and uses a variety of solid catalysts to give more valuable end products. Cracking is ordinarily effected to produce gasoline as the most valuable product and is generally conducted at temperatures of about 750° F. to about 1100° F., preferably about 850° F. to about 950° F., at pressures up to about 2000 psig., preferably about atmospheric to about 100 psig. and without substantial addition of free hydrogen to the system. In cracking, the feedstock is usually a petroleum hydrocarbon fraction such as straight run or recycle gas oils or other normally liquid hydrocarbons boiling above the gasoline range.

The present invention relates to the improvement of catalyst performance in hydrocarbon conversion where metal contamination, i.e., poisoning, occurs. Although referred to as "metals", these catalyst contaminants may be present in the hydrocarbon feed in the form of free metals or relatively nonvolatile metal compounds. It is, therefore, to be understood that the term "metal" as used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present in petroleum stocks, including some iron, petroleum stocks also have a tendency to pick up tramp iron from transportation, storage and processing equipment. Most of these metals, when present in a stock, deposit in a relatively non-volatile form on the catalyst during the conversion process so that regeneration of the catalyst to remove deposited coke does not also remove these contaminants.

Typical crudes which are contaminated with metals and some average amounts of metal are: North slope, 11 ppm nickel, 33 ppm vanadium; Lagomedio (Venezuelan), 12 ppm nickel, 116 vanadium; light Iranian, 16 ppm nickel, 44 ppm vanadium; heavy Iranian, 30 ppm nickel, 22 ppm vanadium. In general, a crude oil can contain from about 5 to 500 ppm nickel and from about 5 to 1500 ppm vanadium. Moreover, since the metals tend to remain behind during processing, the bottoms of typical feeds will have an amount of metals two, three, four times or more than the original crude. For example, reduced crude or residual stocks can have vanadium levels as high as 1000-2000 ppm. Typical residual stocks and their vanadium level include: Sag River atmospheric residuum, 48 ppm vanadium; heavy Iranian atmospheric residuum, 289 ppm vanadium; Canadian tar sand bitumen, 299 ppm vanadium; Tia Juana Vacuum residuum, 570 ppm vanadium; and Orinoco Heavy Crude, 1200 ppm vanadium. The higher the metal level in the feed, the more quickly a given catalyst will be poisoned and consequently the more often or more effective the demetallization of that catalyst must be.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate on the catalyst and, since they affect process performance, are also referred to as "poisons". A poisoned catalyst with these metals generally produces a higher yield of coke and hydrogen at the expense of desired products, such as gasoline, fuel oils and butanes. For instance, U.S. Pat. No. 3,147,228 reports that it has been shown that the yield of butanes, butylenes and gasoline, based on converting 60 volume percent of cracking feed to lighter materials and coke dropped from 58.5 to 49.6 volume percent when the amount of nickel on the catalyst increased from 55 ppm to 645 ppm and the amount of vanadium increased from 145 ppm to 1480 ppm in a fluid catalytic cracking of a feedstock containing some metal contaminated stocks. Since any cracking units are limited by coke burning or gas handling facilities, increased coke or gas yields require a reduction in conversion or throughput to stay within the unit capacity.

Many patents have issued disclosing various approaches to removing metals from hydrocarbon conversion catalysts and then returning the demetallized catalyst to hydrocarbon conversion service. Certain of these patents involve chlorinating metal contaminated alumina, silica-alumina and silica catalysts at elevated temperatures. See, for example, U.S. Pat. Nos. 3,150,104; 3,122,510; 3,219,586; and 3,182,025 each of which is incorporated in its entirety herein by reference. In certain instances, prior patents have taught the use of liquid aqueous compositions containing ammonium ion to remove vanadium from the oxide-based catalyst and/or to at least partially neutralize the chlorine and/or hydrogen chloride which exists with the chlorinated, oxide-based catalyst. In the more recent past, other demetallization processes have been suggested. See, for example, U.S. Pat. Nos. 4,101,444; 4,163,709; 4,163,710; 4,243,550 and related patents, and commonly assigned U.S. patent applications Ser. No. 881,334, filed July 2, 1986, and Ser. No. 895,130, filed Aug. 11, 1986, each of which patents and applications is incorporated in its entirety herein by reference.

As an alternative to demetallizing metal contaminated catalysts, such catalysts have been treated with various metal components to passivate or effectively inactivate the contaminating metal or metals. Thus, in these processes, the contaminating metals remain on the catalyst but are passivated so that the harmful effects of the contaminating metals on the hydrocarbon conversion are reduced. A large number of passivating metal components have been suggested, for example, antimony, tin, gallium, indium, zinc, tellurium, aluminum, cadmium, arsenic, and mixtures thereof. Many patents have been directed to such metals passivation, for example, U.S. Pat. Nos. 4,324,648; 4,348,273; 4,504,381; 4,415,440; 4,167,471; 4,363,720; 4,326,990; and 4,396,496, each of which is incorporated in its entirety herein by reference. While passivation of contaminating metals has been effective to reduce certain of the detrimental effects of the contaminating metals, many of the passivating metals can be hazardous, particularly if present on the catalyst in relatively large concentrations. In addition, the overall cost of metals passivation increases as the amount of contaminating metals on the catalyst increases, and may become prohibitively expensive at high concentrations of contaminating metals.

Clearly, in spite of the substantial amount of past work, there still remains a need for a further improved process to advantageously affect at least one of the catalytic properties of metal contaminated, hydrocarbon conversion catalysts.

Therefore, one object of the present invention is to provide an improved process for treating a hydrocarbon conversion catalyst.

A further object of the invention is to provide an improved process for demetallizing a metal contaminated, catalyst capable of promoting hydrocarbon conversion.

Another object of the present invention is to provide an improved hydrocarbon conversion process utilizing, as at least a portion of the catalyst, a treated catalyst. Other objects and advantages of the present invention will become apparent hereinafter.

A process for treating a catalyst useful to promote the conversion of a substantially hydrocarbon feedstock has been discovered. The feedstock contains at least one first metal at least a portion of which is deposited on the catalyst, i.e., during the hydrocarbon conversion step, forming a first metal-containing catalyst. In one broad aspect, the present treating process comprises contacting the catalyst with at least one component of at least one second metal selected from the group consisting of antimony, tin, gallium, indium, zinc, tellurium and mixtures thereof and producing a catalyst having an increased second metal content; and demetallizing the first metal-containing catalyst to provide a demetallized catalyst having a reduced first metal content. The catalyst having an increased second metal content preferably has increased resistance to the deleterious effect or effects resulting from the deposition of the first metal on the catalyst. The second metal on the catalyst may be said to passivate the first metal on the catalyst, e.g., to reduce the deleterious effect of the first metal on the catalyst. Such increased resistance or metals passivation preferably manifests itself in the catalyst having an increased second metal content having at least one improved hydrocarbon conversion catalytic property, e.g., improved catalytic activity, desired product selectivity, physical stability, catalytic activity stability, desired product stability and the like.

The present invention provides substantial and surprising benefits. For example, the present process can often be conducted simply and inexpensively, thus providing a relatively easy to operate and cost effective approach to improve catalytic performance. Also, since relatively reduced amounts of one or more of the second metals are employed, reduced overall costs and reduced potential hazards are involved in practicing the present invention relative to, for example, metals passivation without demetallization.

The conditions for the second metal component catalyst contacting should, of course, be chosen so that the physical and chemical structure and make-up of the catalyst is not unduly, detrimentally affected. Preferably the amount of second metal provided to the catalyst is such that the atomic ratio of the second metal to the first metal in the first metal-containing catalyst is in the range of about 0.1 to about 1.0. Greater amounts of second metal tend to reduce the surface area of the catalyst and/or otherwise detrimentally affect the catalyst, thereby reducing the catalytic effectiveness of the catalyst.

The second metal-containing component useful in this invention is any second metal-contacting component or components which can be contacted with the catalyst to increase the concentration of second metal on the catalyst. The valence state of the second metal in the second metal-containing component or components contacted with catalyst is not critically important. Thus, second metal-containing compounds with the second metal in different valence states, can be employed in the process of the present invention. Elemental second metal, inorganic second metal compounds and organic second metal compounds as well as mixtures thereof are suitable sources of second metal.

Examples of second metal sources which can be employed include second metal oxides and the hydrates of such compounds. Second metal halides, for example, fluorides, chlorides, iodides, and second metal heterohalides, for example, bromotrichlorides; as well as the hydrates of such compounds can be employed as the second metal source. Hydrides can be used as a source of second metal. Second metal nitrates can be used in accordance with the invention. Second metal selenides can also be employed as the second metal source.

Of course, organic compositions can be employed as the source for second metal. Generally, the organic compounds contain about one to about 48 carbon atoms for reasons of economics and availability, although organic compounds having a greater number of carbon atoms are also applicable. Thus, organic polymers can be employed. In addition to carbon and hydrogen, the organic moiety can also contain other elements, for example, second metal, phosphorus, sulfur, oxygen, nitrogen and halogen.

Examples of organic sources of second metal include carboxylates, carbonates, hydrocarbyl compounds, and hydrocarbyl oxides. Thus, second metal formates, acetates, butyrates, octoates, decanoates, oxylates, benzoates, cyclohexanecarboxylates, propylcarbonates, tetrabutyl, tetraoctyl, tetradodecyl, tetraphenyl, dipropyl oxide, dibutyl oxide, dioctyl oxide, diphenyl oxide, diethyl carbamates, tri-n-propyl chloride and dibutyl dibromide are suitably employed as second metal sources in accordance with the present invention.

In accordance with one embodiment of this invention, the catalyst is contacted with a passivating amount of a second metal source. By passivating amount of second metal source is meant an amount of the second metal source sufficient to provide the catalyst with increased second metal content with at least one improvement selected from the group consisting of an increase in catalyst activity, an increase in the selectivity of the catalyst for desired, e.g., gasoline boiling range, products, a reduction in the production of undesired products, e.g., coke and/or hydrogen, relative to a catalyst containing substantially no second metal. Preferably, the catalyst is contacted with a sufficient amount of second metal-containing component or source to provide an increase in the selectivity of hydrocarbon cracking catalyst for cracking a substantially hydrocarbon feedstock to gasoline boiling range products.

The catalyst is preferably contacted with a sufficient amount of second metal-containing component to impart to the catalyst an incremental amount of second metal in the range of about 0.0001% through 4% by weight, calculated as elemental second metal, based on the weight of the second metal-treated catalyst. More preferably, the catalyst is contacted with a sufficient amount of second metal to impart thereto about 0.001 to about 2% by weight of second metal based on the weight of the second metal-treated catalyst. A second metal concentration on the catalyst in the range of about 0.005% to about 1% by weight, calculated as elemental second metal, based on the weight of the second metal-treated catalyst is a still more preferred, with a second metal concentration of about 0.01% to about 0.15% by weight based on weight of second metal-treated cracking catalyst being particularly preferred.

A variety of methods can be used to contact the catalyst with the second metal source. When contacting the catalyst with solid second metal-containing compositions, the composition in finely divided form can be mixed with the catalyst in an ordinary manner such as by rolling, shaking, stirring or the like. Alternatively, these sources can be dissolved or dispersed in a suitable liquid, for example, water, hydrocarbon or aqueous acid, depending in part upon the particular composition being employed, and the resulting solution or dispersion can be used to contact the catalyst. Conventional techniques such as impregnation, precipitation, spraying, ion exchange and the like may be used to effect such contacting. When employing an oil-soluble second metal source, one method for contacting the second metal source with the catalyst is to dissolve or disperse the selected source in the substantially hydrocarbon feedstock to be used in the hydrocarbon conversion process. In this case, the hydrocarbon feedstock and the second metal source contact the catalyst at about the same time. Additionally, if desired, the catalyst can be exposed to the second metal source in vapor form to contact the second metal source with the catalyst. Of course, combinations of the various methods can be employed to achieve the desired contacting of the catalyst and the second metal source.

The second metal is preferably selected from the group consisting of antimony, tin and mixtures thereof, in particular antimony.

In practicing the present process, the first metal contaminated catalyst is subjected to demetallization to reduce the amount of at least one of the first metals on the catalyst. Such demetallization may include any step or combination of steps which act to produce a catalyst having a reduced content of at least one first metal. For example, such demetallization may include at least one of the following: oxidizing the catalyst, chlorinating the catalyst, sulfiding the catalyst, water washing the catalyst, subjecting the catalyst to reductive/oxidative washes, and the like. A number of these demetallizing steps are described in more detail hereinafter.

In one embodiment, the demetallized catalyst is contacted with at least one of certain second metal components to increase the second metal content of the demetallized catalyst. Although the specific conditions of this contacting may vary widely, this contacting is preferably carried out at conditions similar to those discussed herein regarding the second metal-containing component/catalyst contacting described herein. More preferably, the second metal-containing component/demetallized catalyst contacting is carried out at conditions effective to reduce the deleterious effect on catalytic performance of at least one first metal remaining on the demetallized catalyst.

The composition of the catalysts to be treated in the present invention may vary widely, provided that such catalysts (without the metal contaminants) are capable of promoting the desired hydrocarbon conversion, the particular chemical make-up chosen being dependent, for example, on the type of hydrocarbon chemical conversion desired. Thus, the catalysts suitable for treatment in the present invention often comprise at least one of the natural or synthetic materials which are capable of promoting the desired hydrocarbon conversion. For example, when the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation and dealkylation, such suitable materials include acid-treated natural clays, such as montmorillonite, kaolin and bentonite clays; natural or synthetic amorphous materials, such as alumina, silica, silica-alumina, silica-magnesia and silica-zirconia composites; and crystalline materials.

The catalyst composition to be treated in the present invention preferably comprise at least one synthetic crystalline material in an amount effective to promote the desired hydrocarbon conversion at hydrocarbon conversion conditions. Materials known as zeolites or molecular sieves are one preferred class of synthetic crystalline materials. Useful zeolites include not only synthetic zeolites, but also naturally occurring zeolites the chemical make-up of which is modified or changed to enhance one or more of the catalytic properties of the naturally occurring zeolites.

When the desired hydrocarbon conversion involves one or more of hydrocarbon cracking (preferably in the substantial absence of free molecular hydrogen), disproportionation, isomerization, hydrocracking, reforming, dehydrocyclization, polymerization, alkylation and dealkylation, the catalyst in one embodiment preferably comprises one or more synthetic crystalline material, such as aluminosilicates, e.g., ZSM-series, LZ-Z10, LZ-10, USY and the like. Certain of these synthetic crystalline materials are discussed in U.S. Pat. Nos. 4,310,440; 4,440,871; 4,500,651; and 4,503,023. Of these, catalysts which include a catalytically effective amount of USY are particularly preferred.

Compositions of the catalysts which are particularly useful in the present invention are those in which the synthetic crystalline materials are incorporated in amounts effective to promote the desired hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of alumina, silica, silica-alumina, magnesia, zirconia, mixtures of these and the like. The synthetic crystalline material is preferably incorporated into the matrix material in amounts within the range of about 1% to about 75%, more preferably about 2% to about 50%, by weight of the total catalyst. The preparation of crystalline-amorphous matrix catalytic materials is described in U.S. Pat. Nos. 3,140,253 and RE.27,639. Catalytically active synthetic crystalline materials which are formed during and/or as part of the methods of manufacturing the catalyst are within the scope of the present invention.

The catalysts useful in the catalytic hydrocarbon cracking embodiment of the present invention may be any conventional catalyst capable of promoting hydrocarbon cracking at the conditions present in the reaction zone, i.e., hydrocarbon cracking conditions, and preferably, containing at least one of the above-noted synthetic crystalline materials. Similarly, the catalytic activity of such catalysts is restored at the conditions present in a conventional cracking unit regeneration zone. Typical among these conventional catalysts are those which comprise alumina, silica and/or silica-alumina, and preferably at least one synthetic crystalline material, e.g., aluminosilicate, having pore diameters of about 8 Angstroms to about 15 Angstroms and mixtures thereof. When the catalysts to be used in the hydrocarbon cracking embodiment of the present invention contain crystalline aluminosilicate, the crystalline aluminosilicate may, prior to the treating of the present invention, include minor amounts of conventional metal promoters such as the rare earth metals, in particular cerium. The catalyst to be treated according to the present catalyst treatment process may contain one or more of the present second metals.

As noted above, the first metal contaminated catalyst is subjected to demetallization to reduce the amount of at least one first contaminant metal on the catalyst. Various demetallizing process schemes are well known in the art. The exact demetallization method is a function of the metals level on the catalyst and the desired degree of metals removal sought. This demetallization can be obtained through activation steps such as by first converting at least a portion of the metals to a metal-sulfur containing compound and then oxidizing and water washing the regenerated catalyst. This oxidation can be effected in either a liquid, e.g., aqueous, or gaseous medium or by other means known to those trained in the art such as illustrated in Anderson, U.S. Pat. Nos. 3,147,228 and 3,147,209 and Disegna et al, U.S. Pat No. 3,252,918, each of which is incorporated in its entirety by reference herein.

If a portion of the first metals are to be first converted to a metal-sulfur containing compound, this step can be performed by contacting the first metal contaminated catalyst with elemental sulfur vapors, or more conveniently by contacting the poisoned catalyst with a volatile sulfide, (including one ore more components capable of generating volatile sulfide at the contacting conditions), such as $H_2S$, $CS_2$ or a mercaptan at an elevated temperature generally in the range of about 500° F. to about 1700° F., preferably about 800° F. to about 1400° F., and a sulfiding vapor partial pressure of about 0.05 to 30 atmospheres, or more preferably from about 0.2 to 25 atmospheres. Hydrogen sulfide is the preferred sulfiding agent. Pressures below atmospheric can be obtained either by using a partial vacuum or by diluting the vapor with a gas such as hydrogen or nitrogen. Particularly preferred are mixtures of hydrogen sulfide with hydrogen and/or carbon monoxide and/or carbon dioxide. The time of contact varies on the basis of the temperature and pressure chosen and other factors such as the amount of first metal to be removed. Such contacting may run for up to about 20 hours or more, preferably about 0.25 hours to about 20 hours depending on the conditions and the severity of the poisoning. Temperatures of from about 900° F. to about 1350° F. and pressures approximately 1 atmosphere or less are preferred. More preferably such contacting continues for at least about 1 to 2 hours but the time, of course, can depend upon the manner of contacting the catalyst system, e.g., batch or continuous, as well as the rate of diffusion within the catalyst matrix.

Exposure of the catalyst to oxidation temperature, preferably in the range of about 525° F. to about 725° F. converts at least a portion of the sulfur-containing metal compounds on the catalyst to form a dispersible or removable by a subsequent washing step. Oxidation can be performed by either a gaseous or liquid phase oxidation to provide at least a portion of the first metal poisons, e.g., nickel, vanadium and iron, in a readily removable, dispersible form. For example, one of the sulfur-containing metal compounds may be converted to the simple monosulfide or oxygenated sulfur salts. As used herein, "dispersible" is intended to include minute particle size material, as well as soluble and colloidal size particles.

The demetallization may make use of chlorination, preferably vapor phase chlorination, at moderately elevated temperatures up to about 700° F. or even up to about 900° F. or 1000° F., wherein the catalyst composition and structure is not materially harmed by the treatment and a substantial amount, preferably at least about 30% and more preferably at least about 50%, of the contaminating or poisoning metals content is converted to chlorides. Such catalyst chlorination procedures are more fully described in U.S. Pat. Nos. 3,150,104; 3,122,510; 3,219,586; and 3,182,025 and commonly assigned, U.S. Patent application Ser. No. 881,334, filed July 2, 1986, each of which is hereby incorporated in its entirety herein by reference. Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950° F. to about 1400° F., more usually about 1000° F. to about 1350° F. Combustion of coke from the catalyst is rapid, and for reasons of economy only enough air is used to supply the needed oxygen. Average residence time for a portion of catalyst in the regenerator may be on the order of about a few minutes, e.g., about 5 minutes to about 10 minutes, and the oxygen content of the effluent gases from the regenerator may be less than about ½% by volume. When later oxygen treatment is employed in this invention, the regeneration of the catalyst is generally regulated to give a carbon content of less than about 0.5% by weight.

Treatment of the regenerated catalyst with molecular oxygen-containing gas to increase vanadium removal is preferably conducted at temperatures preferably above the temperature present in the catalyst regeneration zone, more preferably in the range of about 1000° F. to about 1800° F. but below a temperature where the catalyst undergoes any substantial deleterious change in its physical or chemical characteristics. The catalyst is preferably in a substantially carbon-free condition during this high temperature treatment. If any significant amount of carbon is present in the catalyst at the start of this high-temperature treatment, the oxygen contact is preferably continued after carbon removal. In any event, after carbon removal, the oxygen treatment of the essentially carbon-free catalyst is preferably at least long enough to provide a substantial amount of vanadium in its highest valence state.

The treatment of the catalyst with molecular oxygen-containing gas prior to the chlorination is preferably performed at a temperature at least about 50° F. higher than the regeneration temperature. The duration of the oxygen treatment and the amount of vanadium prepared by the treatment for subsequent removal is dependent, for example, upon the temperature and the characteristics of the equipment used. The length of the oxygen treatment preferably is in the range of about a quarter of an hour to about four hours or more. The oxygen-containing gas used in the treatment preferably contains molecular oxygen and there is little significant consumption of oxygen in this treatment. The gas may be oxygen, or a mixture of oxygen with inert gas, such as air or oxygen-enriched air. The partial pressure of oxygen in the treating gas may range widely, for example, from about 0.1 to 30 atmospheres. The factors of time, partial pressure and extent of vanadium stabilization may be chosen with a view to the most economically feasible set of conditions. It is preferred to continue the oxygen treatment for at least about 15 or 30 minutes with a gas containing at least about 1% by volume, preferably at least about 10% by volume oxygen.

After converting at least a portion of the contaminant metal or metals on the catalyst to a water soluble or dispersible form, the catalyst is contacted or washed in a liquid aqueous composition to remove at least a portion of the contaminant metal or metals.

The water used is sometimes distilled or deionized prior to contact with the catalyst. However, the aqueous medium can contain extraneous ingredients in trace amounts, so long as the medium is aqueous-based and the extraneous ingredients do not interfere with demetallization or adversely affect the properties of the catalyst. Temperatures of about 150° F. to the boiling point of water are helpful in increasing the solubility of the metal compounds, e.g., chlorides. Temperatures above 212° F. and elevated pressures may be used but the results do not seem to justify the added equipment.

The initial liquid aqueous composition may be a reductive wash medium, which is preferably followed by an oxidative wash. These washes may be given alternately or several reductive washes may be followed by several oxidative washes. When alternating washes are used, the final wash is preferably an oxidative wash. As used herein, "reductive" wash refers to a wash with an aqueous solution containing a reducing agent or an agent which may give up electrons. Similarly, "oxidative" wash refers to a wash with an aqueous solution containing an oxidizing agent or an agent which may accept electrons. Moreover, "wash" refers to a treatment with the solution which may be accomplished by contacting the solid composition with the wash solution for a time sufficient to cause an interaction between the solution and solid composition thereby removing at least a portion of the metal poison. The contacting may be a batch operation, a semicontinuous operation or a continuous operation. Thus, a "wash" may include merely stirring in a batch vessel or a complex series of counter current contactors or continuous contactors.

The reductive washes and oxidative washes useful in the present invention are more fully described in U.S. Pat. No. 4,101,444 and in commonly assigned, U.S. patent application Ser. No. 881,334; filed July 2, 1986.

After the catalyst is washed, the catalyst slurry can be filtered to give a cake. The cake may be reslurried one or more times with water or rinsed in other ways, such as, for example, by a water wash of the filter cake.

If desired, additional metals removal may be obtained by repeating the demetallization step or using one or more other, e.g., known demetallization steps.

After the catalyst has been subjected to one or more demetallization procedures, e.g., as described above, the demetallized catalyst may be (1) contacted with at least one ammonium ion-containing component to increase the ammonium ion content of the catalyst; and/or (2) contacted with at least one rare earth metal ion-containing component to increase the rare earth metal ion content of the catalyst. Steps (1) and (2) are more fully described in commonly assigned U.S. patent application Ser. No. 895,130, filed Aug. 11, 1986, which is incorporated in its entirety herein by reference.

The catalyst, and preferably the demetallized catalyst including a reduced amount of at least one first metal relative to the amount of such first metal on the catalyst prior to demetallization, is contacted with at least one second metal component. This contacting may occur in the hydrocarbon conversion system, e.g., the reaction zone of a conventional fluid catalytic cracking unit, under conditions effective to provide the desired hydrocarbon conversion and suitable for the second metal component catalyst contacting. Such conditions are conventional and have been set forth in many of the above-noted patents relating to metals passivation of catalysts.

After demetallization, the demetallized catalyst may be transferred to a hydrocarbon conversion system, for instance, to a catalyst regenerator. The catalyst may be transferred as a slurry, or it may be desirable first to dry the catalyst, for example, at a temperature in the range of about 215° F. to about 320° F. Also, prior to using the demetallized catalyst in the hydrocarbon conversion operation it can be calcined, for example, at temperatures preferably in the range of about 700° F. to about 1300° F. Preferably, the catalyst is not calcined at a temperature higher than the temperature present during catalyst regeneration, e.g., in the catalyst regeneration zone, prior to using the catalyst in the hydrocarbon conversion operation. Such high temperature calcination has been found to reduce the catalytic effectiveness of the catalyst. The catalyst may be slurried with hydrocarbons and added to the reactor vessel, if desired. In one particular embodiment, the substantially hydrocarbon feedstock to be converted is provided with at least one second metal-containing component in an amount effective to increase the second metal content of the catalyst, e.g., demetallized catalyst, regenerated catalyst and/or virgin or new catalyst, entering the conversion or reaction zone.

The catalyst to be demetallized may be removed from the hydrocarbon conversion systems—that is, the stream of catalyst which, in most conventional procedures, is cycled between conversion and regeneration zones—before the first metal, i.e., metal poison, content reaches about 100,000 ppm., the first metals, e.g., alkali metals, nickel, vanadium, iron, copper and mixtures thereof, being calculated as elemental metals.

The amount of alkali metals, nickel, vanadium, iron, and/or copper removed or the proportions of each contaminant metal removed in practicing the procedures outlined above may be varied by proper choice of treating conditions. It may prove necessary, in the case of very severely poisoned catalyst, to repeat the demetallization to reduce the metals to an acceptable level, perhaps with variations when one metal is greatly in excess. Because of the second metal component contacting of the present invention, the demetallization step may be conducted at relatively less severe conditions, thus protecting the physical structure and catalytic properties of the catalyst from undue deterioration which might be caused by demetallizing the catalyst under severe conditions. Preferably, the present catalyst treatment process, including one or more of the above-noted demetallization steps, will provide greater than about a 50 weight % reduction in nickel, about 50 weight % reduction in vanadium and about 30 weight % reduction in iron. Such processing preferably provides about 70-90 weight reduction in nickel, about 50-80 weight % reduction in vanadium and about 30-75 weight % reduction in iron when the catalyst initially contains as much as about 0.1 to 0.5 weight % nickel, about 0.3 to 1.0 weight % vanadium and about 0.2 to 1.2 weight % of iron.

In this invention, the substantially hydrocarbon oils utilized as feedstock for a given conversion process may be of any desired type normally utilized in such hydrocarbon conversion operations. The feedstock may contain alkali metals nickel, iron, copper and/or vanadium as well as other metals, including one or more of the present second metals which may be added to benefit the catalyst, as described above. Such substantially hydrocarbon feedstocks may also include materials, preferably minor amounts of materials, containing other elements such as oxygen, sulfur, nitrogen and the like. The catalyst may be used to promote the desired hydrocarbon conversion by employing at least one fixed bed, moving bed or fluidized bed (dense or dilute phase) of such catalyst. Bottoms from hydrocarbon processes, (i.e., reduced crude and residuum stocks) are particularly highly contaminated with these metals and therefore rapidly poison catalyst used in converting bottoms to more valuable products. For example, a bottom may contain about 100-1500 ppm Ni, about 100-2500 ppm V and about 100-3000 ppm Fe. For typical operations, the catalytic cracking of the hydrocarbon feed would often result in a conversion of about 10 to 80% by volume of the feedstock into lower boiling, more valuable products.

The present invention is particularly suitable for treating catalysts utilized in the catalytic cracking of reduced or topped crude oils to more valuable products such as illustrated in U.S. Pat. Nos. 3,092,568 and 3,164,542, each of which patents is incorporated in its entirety herein by reference. Similarly, this invention is applicable to processing shale oils, tar sands oil, coal oils and the like where metal contamination of the processing, e.g., cracking catalyst can occur.

The following non-limiting examples illustrate certain aspects of the present invention.

EXAMPLES 1 TO 24

A mass of commercial equilibrium fluid catalytic cracking catalyst was obtained for testing. This catalyst was commercially manufactured and contained a catalytically effective amount of USY synthetic zeolite. The catalyst had been used in a commercial fluid bed catalytic cracking operation and included amounts of alkali metal, vanadium, iron and nickel from the catalytic cracking hydrocarbon feedstock which became associated with the catalyst when the catalyst was in the cracking reaction zone. The catalyst used in the testing was substantially carbon free.

Various portions of this catalyst were subjected to the one or more of the following procedures.

The following vessel was used in certain of the procedures. A two inch i.d. by eighteen inch long quartz vessel fitted with a coarse quartz frit was used as a reactor vessel. One inch i.d. by ten inch long extensions were positioned at either end of this reactor vessel and terminated in ball joints which allowed quick disconnecting of the entire assembly, if desired. Heat to the fluid bed reactor vessel was supplied by a Lindberg Model 54442-D furnace. Heat tracing of entry and exit gases was effected by external heat tape wrapping.

PROCEDURE A

The catalyst was charged to this reactor vessel and fluidized with compressed air while heating to 1350 degrees F. Approximately two hours were needed for heating to operating temperature, including a fifteen minute period when the gas lines and the fluid bed were flushed with nitrogen before introducing $H_2S$.

After this nitrogen flush, the catalyst bed was fluidized with 100% $H_2S$ for four hours. Following this sulfiding step, the reactor vessel and contents were cooled to 650 degrees F. under nitrogen fluidization. The catalyst bed was then fluidized with 100% chlorine gas for 90 minutes at 650 degrees F. Following the chlorination, the reactor was flushed with nitrogen for fifteen minutes while maintaining a temperature of about 650 degrees F. This nitrogen purge removed some chlorine from the void space in the catalyst bed and some volatile vanadium, and iron chlorine-containing components.

PROCEDURE A (1)

The hot chlorinated catalyst was cooled to ambient temperature, i.e., about 70 degrees F., and contacted with a liquid water wash. The catalyst/water slurry was filtered on a Buchner funnel, and oven dried at 230 degrees F. overnight.

PROCEDURE A (2)

The hot chlorinated catalyst was cooled to ambient temperature and contacted with a liquid water wash. The catalyst/water slurry was filtered on a Buchner funnel, reslurried again in water and refiltered on a Buchner funnel and oven dried at 230 degrees F. overnight.

PROCEDURE B

The catalyst was subjected to calcining at a temperature of 1330 degrees F. to 1350 degrees F. for 4 hours in an air atmosphere.

PROCEDURE B (1)

The catalyst was subjected to calcining at a temperature of 1330 degrees F. to 1350 degrees F. for 4 hours in an air atmosphere. The catalyst was then washed with liquid water, filtered and oven dried at 230 degrees F. overnight.

PROCEDURE C

The catalyst was slurried with water and sufficient sulfur dioxide was added to give an initial pH of about 2.0. The temperature was maintained at about 70 degrees F for about 3 minutes. The catalyst was then filtered and the aqueous sulfur dioxide wash was repeated twice more to give a total of 3 reductive washes.

The catalyst was then slurried with water and $H_2O_2$ at a rate of about 10–40 pounds/ton of catalyst was added. The initial temperature was about 175 degrees F. and the wash was carried out for 3 minutes. The $H_2O_2$ wash was repeated once more to give a total of two oxidative washes. The catalyst was then washed with water, filtered and then dried under a vacuum at about 230 degrees F. overnight.

PROCEDURE D

The catalyst is contacted with an aqueous solution of ammonium salt hydroxide at ambient temperature and at an initial pH of about 4 to 7. The weight ratio of catalyst to solution was about 1:4–20. The contacting continued for 1 hour. The catalyst was then filtered, washed with water and refiltered. The catalyst is then oven dried at 230 degrees F. overnight.

PROCEDURE E

The catalyst is contacted with an aqueous solution of rare earth (mainly cerium and lanthanum) salts at ambient temperature and at an initial pH of about 1–2. The amount of rare earth metal in the solution was about 10–30% by weight. The weight ratio of catalyst to solution was about 1:4–20. The contacting continued for 1 hour with agitation. The catalyst was then filtered, washed with water and refiltered. The catalyst is then oven dried at 230 degrees F. overnight.

PROCEDURE F

The catalyst (in the above-noted vessel) was heated to 1350 degrees F. with an accompanying nitrogen purge. After this purge, the catalyst bed was fluidized with 100% $H_2S$ for four hours. Following this sulfiding step, the reactor vessel and contents were cooled to 600 degrees F. under nitrogen fluidization. The nitrogen was then turned off and air was introduced into the bed to fluidize the catalyst. An exotherm occurred raising the temperature to between 630 degrees F. to 680 degrees F. This air contacting occurred for about 25 minutes. The catalyst was then cooled under nitrogen flow.

The original, untreated catalyst and various treated catalysts were each tested for catalytic activity using the Micro Activity Test (ASTM D 3907-80). Results of these tests are shown in Table 1. In addition, a selected number of these catalysts were analyzed for metal contents to determine the extent of metal removal. These results are shown in Table 2.

TABLE 1

| Example | Treatment(1) | MAT No. | Gasoline, wt % | Coke Factor | Gas Factor |
|---|---|---|---|---|---|
| 1 | None | 65.2 | 46.8 | 3.0 | 1.1 |
| 2 | A,A(1) | 67.6 | 47.2 | 2.4 | 1.2 |
| 3 | A,A(2) | 66.3 | 46.4 | 2.6 | 1.2 |
| 4 | B,A,A(1) | 70.0 | 48.7 | 2.3 | 1.2 |
| 5 | B,A,A(2) | 71.5 | 49.8 | 2.3 | 1.2 |
| 6 | B,A,A(2),C | 72.2 | 50.7 | 1.5 | 1.2 |
| 7 | B,A,A(2),D,B | 70.4 | 47.5 | 2.6 | 1.3 |
| 8 | B,A,A(2),E | 69.7 | 49.0 | 2.1 | 1.2 |
| 9 | B,A,A(2),C,D,B | 75.2 | 50.3 | 1.7 | 1.3 |
| 10 | B,A,A(2),C,E | 71.9 | 50.1 | 1.7 | 1.2 |
| 11 | B,A,A(2),D,B,E | 70.6 | 47.6 | 2.3 | 1.3 |
| 12 | F,C(2) | 66.5 | 45.0 | 3.2 | 1.3 |
| 13 | F,C(3) | 53.8 | 37.8 | 3.9 | 1.2 |
| 14 | F,C(2),D,B | 70.5 | 48.0 | 2.4 | 1.2 |
| 15 | F,C(2),E | 73.0 | 51.2 | 1.9 | 1.1 |
| 16 | F,C(2),D,B,E | 76.2 | 53.2 | 1.5 | 1.1 |
| 17 | B(1) | 60.3 | 41.4 | 3.9 | 1.3 |
| 18 | B(1),D,B | 69.1 | 46.2 | 2.8 | 1.3 |
| 19 | B(1),E | 69.1 | 47.2 | 2.3 | 1.3 |
| 20 | B(1),C(4) | 70.4 | 47.2 | 2.4 | 1.3 |
| 21 | B(1),D,B,E | 70.6 | 46.7 | 2.5 | 1.3 |
| 22 | B(1),C(4),D,B | 69.7 | 47.4 | 2.5 | 1.3 |
| 23 | B(1),C(4),E | 71.0 | 49.0 | 1.8 | 1.2 |
| 24 | B(1),C(4),D,B,E | 69.7 | 48.2 | 2.0 | 1.3 |

(1) Each of the portions of the catalyst except the untreated catalyst was treated to one or more of the procedures in the sequence shown.
(2) No water wash after the $H_2O_2$ wash.
(3) Use 80% $H_2S$ and 20% $H_2$ instead of 100% $H_2S$, and no water wash after the $H_2O_2$ wash.
(4) Procedure C did not include the $H_2O_2$ wash, the reductively washed catalyst was washed with water and dried.

TABLE 2

| | % Metals Removal | | |
|---|---|---|---|
| Example | Vanadium | Nickel | Iron |
| 1 | 0 | 0 | 0 |
| 6 | 40.0 | 88.5 | 62.9 |
| 12 | 36.0 | 80.6 | 38.6 |
| 20 | 30.8 | 4.8 | 0.7 |

Each of the catalysts which was subjected to Procedure E included between 0.2% to about 2% by weight additional rare earth metal, calculated as elemental metal, relative to the untreated catalyst (Example 1 catalyst).

EXAMPLES 25 AND 26

A sample of Phillips Borger commercial equilibrium cracking catalyst, which contained a zeolite component and was contaminated with vanadium and nickel, was selected for testing.

One portion of the catalyst was demetallized using a demetallization process involving oxidation, sulfidation and reductive and oxidative washing of the catalyst. This process was effective to reduce the concentrations of vanadium and nickel in the catalyst and to improve the catalytic activity of the catalyst.

A hexane solution of butylstibine was allowed to interact at ambient temperature for 12 hours with separate portions of both the equilibrium catalyst and the demetallized catalyst. The hexane was evaporated under vacuum and the catalyst samples were dried at 285° C. The atomic ratio of antimony to total contaminant metals on the catalyst samples was about 2. The dried catalyst samples were calcined at 950° F. for 6 hours and then at 1300° F. for 4 hours.

Both catalyst samples were tested for catalytic activity using the Micro Activity Test (ASTM D 3907-80). Results of these tests are shown in Table 2.

TABLE 2

| Example | MAT No. | Coke Factor | $H_2CH_4$ |
|---|---|---|---|
| 25 (Equilibrium Catalyst) | 59.1 | 3.02 | 20.2 |
| 26 (Antimony-containing | 47.9 | 6.64 | 20.7 |

TABLE 2-continued

| Example | MAT No. | Coke Factor | $H_2CH_4$ |
|---|---|---|---|
| Demetallized Catalyst) | | | |

The catalytic activity (as measured by the MAT No.) of the antimony-containing catalyst is substantially reduced relative to the activity of the equilibrium catalyst. Also, the antimony-containing catalyst has an increased (and disadvantageous) tendency to produce coke. The surface area of the equilibrium catalyst was 99 m.$^2$/gm. while that of the antimony-containing catalyst was only 84 m.$^2$/gm. These results demonstrate that excessive amounts of passivating metal or metals may be harmful. It is preferred that the atomic ratio of passivating metal to contaminating metal or metals on the catalyst be in the range of about 0.1 to about 1.

EXAMPLES 27 TO 50

Catalysts demetallized in accordance with procedures described in Examples 2 to 24 are each subjected to the following additional procedure. The demetallized catalyst is contacted with an aqueous solution containing antimony tartrate by the conventional incipient wetness impregnation technique to provide the catalyst with an amount of antimony so that the atomic ratio of antimony to metal contaminants remaining on the demetallized catalyst is 0.5. After this contacting, the catalyst is dried at 230° F. and is then calcined at 900° F. for four hours.

EXAMPLES 51 TO 74

Examples 27 to 50 are repeated except that stannous chloride replaces antimony tartrate, and the catalyst is provided with an amount of tin so that the atomic ratio of tin to metal contaminants remaining on the demetallized catalyst is 0.5.

EXAMPLES 75 TO 128

Catalysts treated in accordance with procedures described in Examples 27 to 74 are included in the circulating catalyst inventory of a commercial fluid bed catalytic cracking unit processing substantially hydrocarbon feedstock containing 500 ppm. by weight of vanadium and about 50 ppm by weight of nickel. Over a period of time, it is determined that all the catalysts perform satisfactorily in this commercial operation.

EXAMPLE 129

A commercially available, zeolite-containing cracking catalyst is used as the circulating catalyst inventory of a commercial fluid bed catalytic cracking unit processing substantially hydrocarbon feedstocks containing 500 ppm by weight of vanadium and about 50 ppm. by weight of nickel. An amount of antimony oxide is combined with the feedstock so that the atomic ratio of antimony to vanadium plus nickel on the catalyst leaving the reaction zone is about 0.25. A portion of the catalyst, after regeneration, is demetallized to remove 60% of the vanadium and 80% of the nickel on the catalyst. The demetallized catalyst is then fed or circulated to the reaction zone. Over a period of time, it is determined that the catalyst performs satisfactorily in this commercial operation.

EXAMPLE 130

Example 129 is repeated except that stannic oxide is used in place of antimony oxide. The atomic ratio of tin to vanadium plus nickel on the catalyst leaving the reactive zone is about 0.25. Over a period of time, it is determined that the catalyst performs satisfactorily in this commercial operation.

While this invention has been described with respect to various specific examples and embodiments, it is to be understood that the invention is not limited thereto and that it can be practiced within the scope of the following claims.

The embodiments of the present invention in which an exclusive property or privilege is claimed are as follows:

1. A process for treating a catalyst used to promote the cracking of a hydrocarbon feedstock containing at least one first metal which is a contaminating metal, at least a portion of said first metal from said hydrocarbon feedstock is deposited on said catalyst forming a first metal-containing catalyst, which process comprises:

demetallizing said first metal-containing catalyst to provide a demetallized first metal-containing catalyst having a reduced first metal content; and contacting said demetallized first metal-containing catalyst with at least one antimony component to increase the antimony content of said demetallized, first metal-containing catalyst and form a treated catalyst having at least one improved hydrocarbon cracking catalytic property relative to said first metal-containing catalyst, provided that the atomic ratio of said antimony to said first metal in said treated catalyst is in the range of about 0.1 to about 1.0.

2. The process of claim 1 wherein said catalyst contains a catalytically effective amount of at least one synthetic crystalline zeolitic material.

3. The process of claim 1 wherein said hydrocarbon cracking comprises hydrocarbon catalytic cracking in the substantial absence of added molecular hydrogen.

4. The process of claim 1 wherein said first metal is selected from the group consisting of alkali metals, nickel, vanadium, iron, copper and mixtures thereof.

5. The process of claim 1 wherein said hydrocarbon cracking comprises hydrocarbon catalytic cracking in the substantial absence of added molecular hydrogen and said first metal is selected from the group consisting of alkali metals, nickel, vanadium, iron, copper and mixtures thereof.

6. The process of claim 1 wherein said demetallization comprises contacting said first metal-containing catalyst at elevated temperature with at least one chlorine-containing component to form a chlorinated catalyst and contacting said chlorinated catalyst with at least one liquid aqueous composition to reduce the amount of said first metal on said catalyst.

7. The process of claim 1 wherein said demetallization comprises contacting said first metal-containing catalyst with at least one sulfur-containing component to convert at least a portion of said first metal into a metal, sulfur-containing compound; contacting said catalyst containing said metal, sulfur-containing compound with at least one oxidizing agent to convert at least a portion of said metal, sulfur-containing compound so that at least a portion of said first metal is in a dispersible form; and contacting said catalyst containing said first metal in dispersible form with an aqueous composition to reduce the amount of said first metal on said catalyst.

8. The process of claim 1 wherein said demetallization comprises contacting said first metal-containing catalyst with a liquid aqueous medium to reduce the amount of said first metal on said catalyst.

9. The process of claim 1 wherein said demetallization comprises (a) contacting said first metal-containing catalyst with a liquid reductive wash medium; and (b) subsequently contacting the reductively washed catalyst with a liquid oxidative wash medium.

* * * * *

UNITED STATES PATENT AND TRADEMARK OFFICE
CERTIFICATE OF CORRECTION

PATENT NO. : 4,824,814
DATED : April 25, 1989
INVENTOR(S) : Frank J. Elvin et al It is certified that error appears in the above—identified patent and that said Letters Patent is hereby corrected as shown below:

Column 2, line 37; delete "any" and insert -- many --.
Column 4, line 18; delete "contacting" and insert -- containing --.
Column 4, line 25; delete ",".
Column 4, line 34; delete ";" and insert -- , --.
Column 10, line 11; after "known" insert -- , --.
Column 14, line 66; delete "$H_2 CH_4$" and insert --$H_2/CH_4$--
Column 15, line 3; delete "$H_2 CH_4$" and insert --$H_2/CH_4$--

Signed and Sealed this

Twenty-fourth Day of October, 1989

Attest:

DONALD J. QUIGG

Attesting Officer

Commissioner of Patents and Trademarks